United States Patent [19]

Plummer

[11] Patent Number: 4,457,618
[45] Date of Patent: Jul. 3, 1984

[54] OPTICAL SYSTEM FOR USE IN ELECTRONIC ENLARGER

[75] Inventor: William T. Plummer, Concord, Mass.
[73] Assignee: Polaroid Corporation, Cambridge, Mass.
[21] Appl. No.: 394,294
[22] Filed: Jul. 1, 1982
[51] Int. Cl.³ ............................................. G03B 27/72
[52] U.S. Cl. .................................................... 355/20
[58] Field of Search ........................ 355/20, 67–71, 355/77, 18

[56] References Cited

U.S. PATENT DOCUMENTS

| | | | |
|---|---|---|---|
| 2,480,423 | 8/1949 | Simmon | 355/20 |
| 2,842,025 | 7/1958 | Craig | 355/20 X |
| 3,153,698 | 10/1964 | Hall et al. | 355/20 X |
| 3,177,764 | 4/1965 | Akima | 355/20 |
| 3,651,252 | 3/1972 | Land et al. | 250/205 X |
| 3,700,329 | 10/1972 | Mason | 355/20 |

FOREIGN PATENT DOCUMENTS

| | | | |
|---|---|---|---|
| 2408019 | 9/1975 | Fed. Rep. of Germany | 355/20 |
| 834025 | 5/1960 | United Kingdom | 355/20 |

Primary Examiner—Donald A. Griffin
Attorney, Agent, or Firm—Francis J. Caufield

[57] ABSTRACT

An optical system for reducing the visual effects of fringing or artifacts in projection prints made with an electronic enlarger employing a flying spot scanner as an illumination source. The optical system includes a graded density aperture mask in conjunction with a raster relay lens to alter the energy distribution of the flying spot so that, as outline areas of the transparency are scanned, fringing varies in a more gradual manner than before thereby rendering the fringing visually unobjectionable.

6 Claims, 8 Drawing Figures

OPTICAL SYSTEM FOR USE IN ELECTRONIC ENLARGER

BACKGROUND OF THE INVENTION

This invention in general relates to photographic projection printing and in particular to the use of an optical system employing an aperture mask in combination with a flying spot type enlarger for controlling tones and reducing certain visual artifacts caused by fringing.

Photographic masking is a technique well-known from early on in the art of projection printing or enlarging. Its essential form involves placing a mask, something which will reduce the quantity of light, in the path of the light forming an image to modify the photographic result otherwise obtainable. When the mask is used to selectively shade different portions of a projected image of a negative to reduce exposure, the masking technique is referred to as dodging, and when used to selectively increase the density of different portions by giving extra exposure, the technique is referred to as burning-in. Thus dodging and burning-in are techniques which can be used to adjust printing exposure from area to area over a negative to compensate for an imbalance of tones which may be present in the negative and thus provides a means for increasing the detail registered in highlights and shadows.

A more elaborate use of masks, also well-known, is for tone control. Here, a mask is employed where it is desired to print a negative with a wide range of tones, i.e., high-contrast, onto a print material having a dynamic range insufficient to capture the range of tones present in the negative. The mask is made as a full-toned, but weak and soft, positive contact print from the hard negative on another film. This is then accurately registered and bound into contact with the negative. When this sandwich is projected, the mask tends to cancel out the negative and has the effect of considerably reducing the contrast of the negative thereby matching its tonal range to that of the print material.

Tone control masks can be either sharp or unsharp. Both sharp and unsharp masks are made by contact printing the negative on print material, but, in the case of the unsharp mask, the negative and print material are typically separated by a spacer so that the mask comes out defocused or with blurred outlines. A negative printed with an unsharp mask appears more sharp than one printed with a sharp mask because there is a tendency for the blurred outlines of the unsharp mask to cancel the slight blurring of outlines present in the negative. Thus, with the unsharp mask, both tone control and higher apparent sharpness are achieved whereas, with the sharp masks, only tone control occurs.

Both sharp and unsharp masks can be mimicked if use is made of a flying spot scanner as a source for illuminating the negative instead of a continuous source like those used in conventional enlargers. With a flying spot scanner, an electron beam moves over the faceplate of a cathode ray tube in a regular pattern to produce a light spot which exposes the negative in point by point fashion. The light emerging from the negative can be continuously monitored by a phototube which in turn can influence the brightness of the light spot. In this manner, an automatic and simultaneous shading and overprinting of various parts of the negative is done according to the local density of the negative. This reduces contrast of the negative in the same way as an unsharp mask because the negative is printed with a light source that is in effect a luminous positive image of the negative. Thus the flying spot scanner performs all the functions of an unsharp mask except that the "light" mask is formed automatically during the printing process and therefore requires no preparatory work or processing.

However, the finite size of the scanning light spot, which determines the unsharpness and hence detail control of the "light" mask, leads to a fringing effect which is characteristic of electronic printing with a moving spot. As the spot scans the boundary of the image from light to dark, the light reaching the monitoring photocell does not change suddenly but gradually. With the spot halfway across the boundary, the light falling on the phototube is halfway between that for the bright and for the dark areas. Because the feedback circuit, which regulates spot intensity, reacts instantly, the boundary of the shadow area begins to receive more exposure than the shadow region just traversed by the spot. Similarly, the edge of the highlight area gets less exposure than the region covered by the spot immediately afterwards. This leads to a dark fringe at the border of the shadow area in the print and a light fringe at the border of the highlight area where it is particularly noticeable.

Thus, while the electronic printing is advantageous for a variety of reasons, it characteristically produces fringing effects or visual artifacts which are highly undesirable in the final image because they are visibly noticeable. Consequently, it is a primary purpose of the present invention to provide projection printing apparatus for reducing fringing artifacts in transparency prints.

It is another purpose of the present invention to provide an optical system employing an aperture mask for use in conjunction with a flying spot illumination type enlarger by which fringing effects or artifacts are made less noticeable in transparency prints.

Other objects of the invention will in part be obvious and will in part appear hereinafter. The invention accordingly comprises the apparatus possessing the construction, combination of elements, and arrangement of parts which are exemplified in the following detailed discription.

SUMMARY OF THE INVENTION

This invention in general relates to projection printing and in particular to apparatus which utilize a novel optical system in conjunction with a flying spot scanner transparency illumination system for providing tone control and reducing the visual effects of fringing around outline areas in a transparency during printing.

The apparatus of the invention operates to project an image of a transparency onto a photosensitive sheet material and comprises means for holding a transparency and the photosensitive material in separated planes.

A projection lens is provided for forming a sharp image of the transparency in the photosensitive material plane.

Means are included for providing a pattern of illumination more or less in registration with the transparency during an exposure interval such that the intensity of the illumination pattern varies in intensity in a predetermined manner in accordance with the local density of the transparency to change the range of tones in the image projected by the projection lens onto the photosensitive material plane and such that fringe artifacts surrounding outline areas in the transparency are rendered visually unobjectionable in prints of the transparency.

Preferably the illumination means comprises a flying spot scanner spaced from the transparency by a predetermined distance and an optical system which images the flying spot of the scanner onto the transparency and alters the energy distribution of the flying spot so that, as outline areas of the transparency are scanned, fringing surrounding the outline areas varies in a gradual manner thereby rendering fringing visually unobjectionable in transparency prints.

DESCRIPTION OF THE DRAWINGS

The novel features that are considered characteristic of the invention are set forth with particularity in the appended claims. The invention itself, however, both as to its organization and method of operation together with other objects and advantages thereof will be best understood from the following description of the illustrated embodiments when read in connection with the accompanying drawing wherein like numbers have been employed in the different figures to denote the same parts and wherein:

DETAILED DESCRIPTION

The present invention in general relates to projection printing and in particular to an optical system for use with an electronic type enlarger for improving the quality of enlargements made with such devices by minimizing the visual effects of certain undesirable artifacts which are inherently present in prints made from systems utilizing flying spot sources of illumination.

Figure 1:
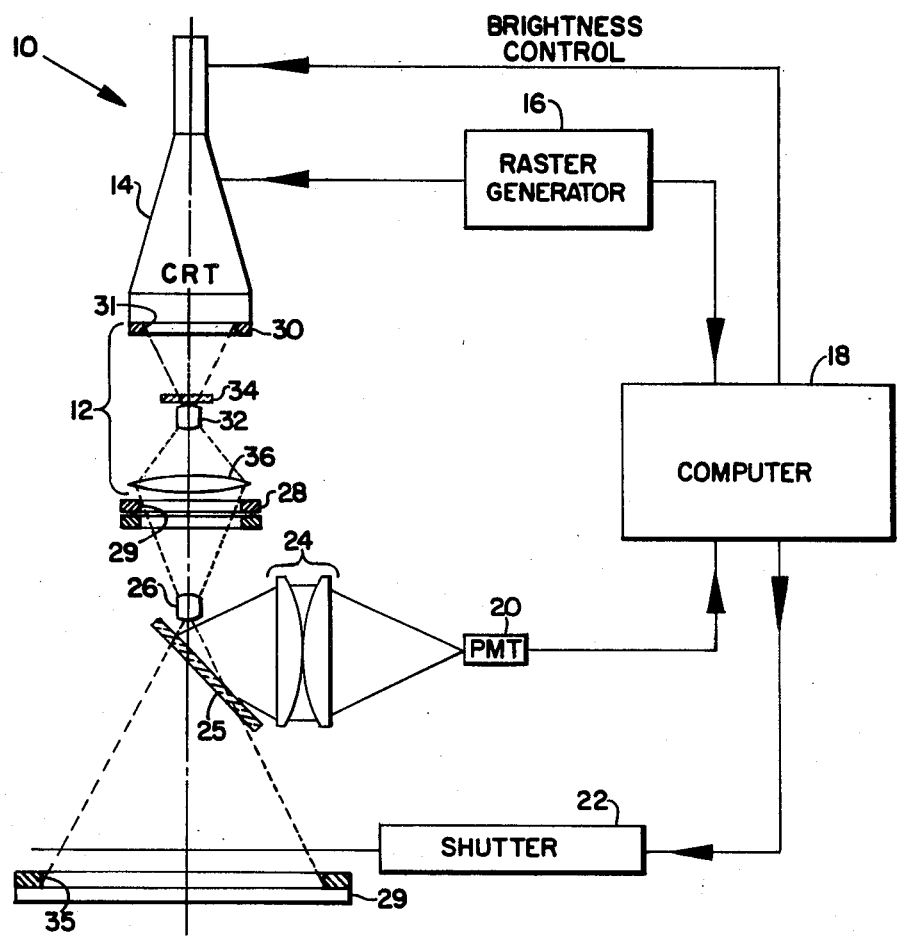
FIG. 1 is a diagrammatic view of an electronic enlarger incorporating the invention.

Referring now to FIG. 1, there is shown at 10 an electronic enlarger having incorporated therein an optical system 12 according to the invention. The other elements shown in FIG. 1 are conventional in nature and will be described only in detail sufficient to understand the operation of the optical system 12.

The electronic enlarger 10, in addition to the optical system 12, comprises a cathode ray tube 14, a raster generator 16, a computer or microprocessor 18, a photomultiplier tube 20, a shutter 22, an objective lens 24, a beamsplitter 25, a projection lens 26, a transparency mount 28, and a print mount 29.

The optical system 12 comprises a field mask 30, a raster relay lens 32, an aperture mask 34 for the raster relay lens 32, and a field lens 36. All the elements of the optical system 12 are arranged between the face of the CRT 14 and the transparency mount 28 along an optical axis, OA, which extends between the center of the CRT face and the center of the print material mount 29.

Figure 2:
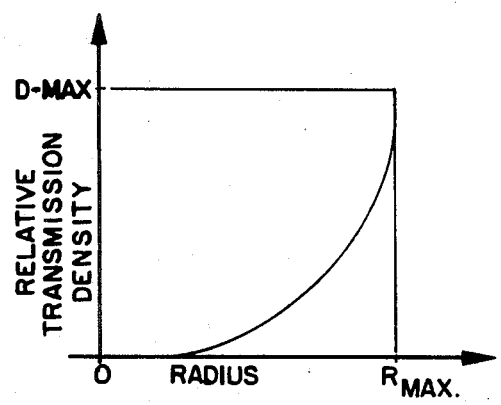
FIG. 2 is a graph showing a representative radial density variation for an aperture mask of the invention.

Field mask 30 is butted flush against the face of the CRT 14 and is provided with an aperture 31 the peripheral edges of which define the active illuminating area of the face of the CRT 14. The raster relay lens 32 is structured to operate at about 1:1 conjugates to image the field mask aperture 31 through the aperture mask 34 onto and in registration with an aperture 29 located within the transparency mount 28. The field lens 36 is located at or nearly at the focal point of the raster relay lens 32 and operates to maximize the amount of light which can pass through the aperture of the projection lens 26. The aperture mask 34 is located at or nearly at the aperture stop of the raster relay lens 32 and comprises a circular filter having a density which increases with radial distance from its center towards its edge as shown diagrammatically in FIG. 2. The purpose of the aperture mask 34 along with the function and operation of the optical system 12 will be elaborated on further hereinafter.

For reasons which will become apparent, the size of the aperture of the projection lens 26 is selected to be large enough to transmit all of the shaded pupil effected by the raster relay lens 32 which is imaged onto the projection lens 26 by the field lens 36.

The transparency mount 28 is adapted to receive within its aperture 29 negative or positive transparencies which are projected via the conventional projection lens 26 through an aperture 35 located within the print material mount 29. The peripheral edges of the aperture 35 act in a conventional way to define the geometry of the enlargement which can be printed.

Positioned within the bundle of rays emerging from the projection lens 26 is a beamsplitter 25 that is arranged to image the lens 26 onto the face of the photomultiplier tube 20 via the objective lens 24. The transmission of the beam splitter 25 is preferably approximately 95% so that only 5% of the light available for exposing the print material is directed onto the photosensitive surface of the photomultiplier tube 20.

The electron beam of the cathode ray tube 14, as is well known, can be focused to a small cross-sectional area on the luminescent face of the CRT 14 and can be varied in location, size and intensity. In the present case the flying spot of illumination defined by the focused electron beam of the CRT 14 is arranged to scan across the field mask aperture 31 in a predetermined raster pattern created by the raster generator 16. The raster generator 16 is under the control of the computer 18 which is programmed in a well-known manner for this purpose. The computer 18 also is programmed to control the brightness of the flying spot and varies the intensity of the flying spot in response to the input received from the photomultiplier tube 20. The effective size of the flying spot is controlled, easily, by a deliberate defocus of the raster relay lens 32. The shutter 22, which is also under the control of the computer 18, is preferably arranged to terminate exposure of the print material via the computer as a function of the total amount of exposure of the print material.

Having described each of the elements of the electronic enlarger 10, its general mode of operation in making an enlargement of a negative transparency will now be discussed. However, it will be appreciated that the invention can be practiced just as well with positive transparencies. Afterwards, the function of the optical system 12 as it relates to the quality of the enlargement made during this process will be explained in detail. To make an enlargement of a transparency, the transparency is first placed into the transparency mount 28 in registration with its aperture 29. The cathode ray tube 14 is then actuated so that the flying spot which it generates scans across the field aperture mask 31 in the raster pattern formerly described. Because the face of the CRT 14 is approximately imaged onto the transparency, the flying spot exposes the image contained in the transparency spot by spot like the scanning system of a television screen and not all at once. During the exposure the scanning beam moves over the entire transparency area in the raster pattern which assures that the spot passes over every point of the transparency for the same length of time. The intensity of the electron beam is automatically controlled according to the density of the negative area that the beam passes over at any instant. For this purpose the light coming through the negative is monitored in the manner previously described by the photomultiplier tube 20 whose output is fed into the computer 18 which in turn increases the intensity of the beam as a function of passing over high density areas and decreases the intensity of the flying spot as a function of passing over low density areas of the transparency. Thus, the computer program for this purpose acts in the manner of a negative feedback system, the flying spot intensity automatically compensating to a desired extent for variations in negative density so that negatives of varying degrees of contrast can be printed on a single grade of paper if desired. Moreover, this system of contrast control reduces the overall tone range of the negative image, without reducing the detail contrast to the same extent. Hence, prints or enlargements produced by the electronic enlarger 10 reproduce all the fine detail of the transparency even if very contrasty without exceeding the contrast range of the paper. The effect of the flying spot scanner exposure is that of an unsharp contrast reducing mask, virtually a luminous positive low contrast image of the negative being printed, and is produced during the printing exposure. Preferably the system is arranged so that the total exposure as previously mentioned is registered and cut off by the shutter 22 via the computer 18 when sufficient light has passed through the transparency to produce a correctly exposed print. Both the contrast and exposure level are preferably adjusted by appropriate scale factors which can be input in a well-known manner to the computer 18.

Figure 3:
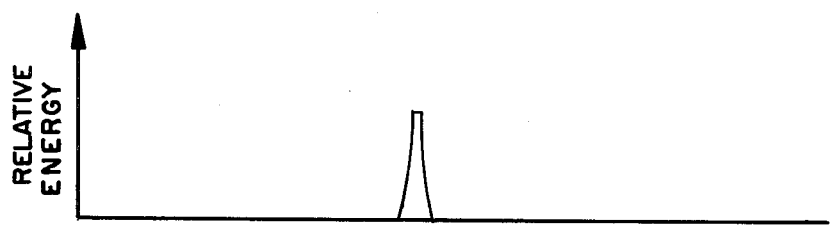
FIG. 3 is a graph showing the energy distribution of an illumination spot provided by a flying spot scanner which forms part of the electronic enlarger of FIG. 1.
Figure 4:
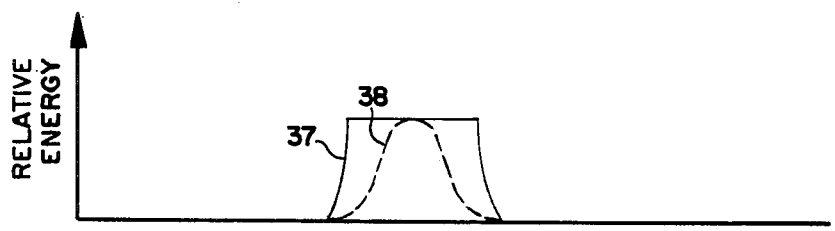
FIG. 4 is a graph showing how the energy distribution of the flying spot of FIG. 3 is modified by the optical system of the invention.

The manner in which the optical system 12 operates to improve the visual appearance of an enlargement made with the system of the invention may best be understood by first examining the intensity distribution (i.e. the point spread function) of the flying spot at the face of the CRT screen. Referring now to FIG. 3, it can be seen that the energy distribution of the flying spot (i.e., the point spread function) is in the form of a very sharp spike distributed over a very small area which moves across the screen in the manner previously described. When this spike is imaged through the raster relay lens 32 via the aperture mask 34 and onto the transparency, its energy distribution is changed from that of the spike shown in FIG. 3 to that represented by the curve 38 in FIG. 4. As can be seen, the effect of the aperture mask 34 and the deliberate slight defocus of the raster relay lens 32 is to spread out the rather spiked energy distribution of the flying spot into a more Gaussian distribution which is unlike how it would appear if the aperture mask 34 were not present and the flying spot were imaged onto the transparency by just the defocused raster relay lens 32. In the latter case, the energy distribution has the appearance of the curve shown diagrammatically at 37 in FIG. 4 and is characterized by more abrupt edges.

Figure 5:
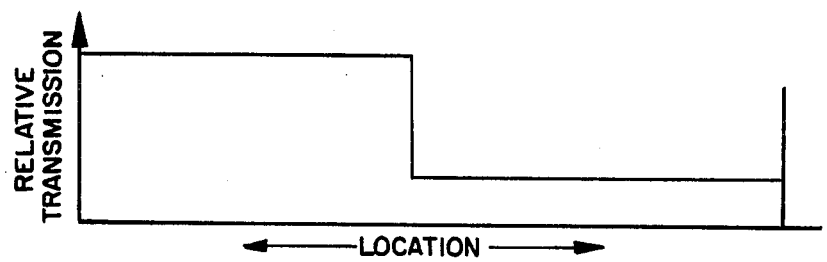
FIG. 5 is a diagrammatic representation of an outline area in a transparency.
Figure 6:
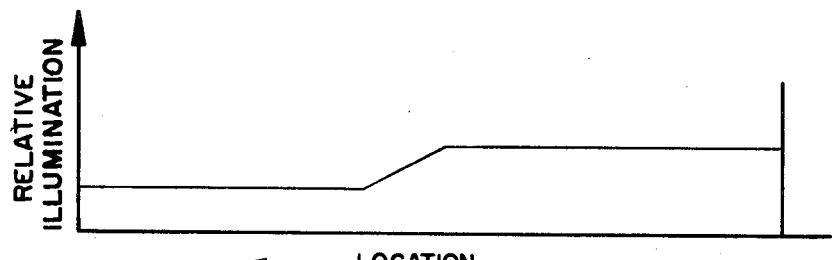
FIG. 6 is a diagrammatic representation of the illumination pattern in the vicinity of the outline area of FIG. 5 as produced by a flying spot scanner light source forming part of the enlarger of FIG. 1.
Figure 7:
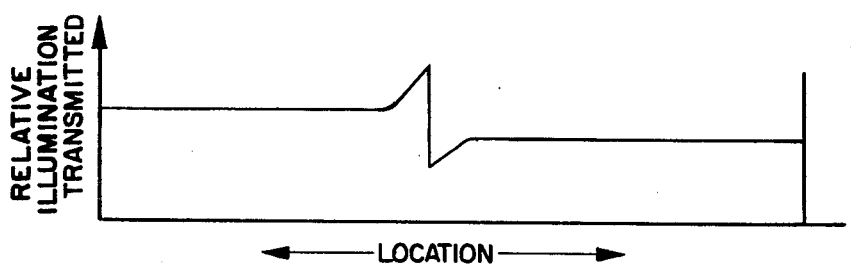
FIG. 7 is a diagrammatic representation of the relative illumination transmitted in the vicinity of the outline area of FIG. 5 as modified by the illumination source pattern of FIG. 6.

The visual effect which this redistribution of energy of the flying spot, as imaged onto the transparency, has on the manner in which outline areas within the image of the transparency are reproduced in the enlargement will best be understood by referring to FIGS. 5 through 8. FIG. 5 presents a transparency outline area that is a boundary region in the image of the transparency which runs from a high transmission area to a low transmission area. Because of the manner in which the energy of the flying spot is redistributed by the optical system 12 and because of the negative feedback nature of the enlarger 10, the luminous mask which is generated on the CRT screen reproduces at the transparency plane the outline area of FIG. 5 as shown in FIG. 6. As shown, the boundary between the light and dark area does not occur abruptly in a step fashion but rather as a smooth curve. It is the product of FIG. 5 and FIG. 6 which is imaged onto the print material and is reproduced on the print material in the manner shown in FIG. 7.

Figure 8:
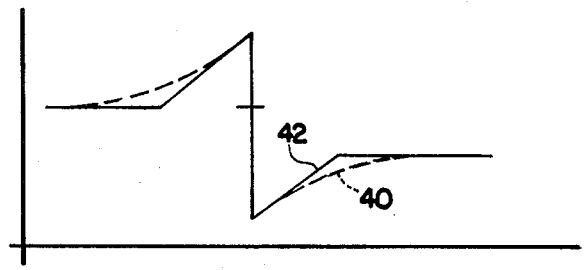
FIG. 8 is a diagrammatic representation of the resultant variation in print density of the outline area of FIG. 7 compared with the prior art.

FIG. 8 shows by comparison how the outline area print density varies across the boundaries between the light and dark areas of the transparency with and without the presence of the optical system 12. The curve 42 represents the density across the outline as it would appear without the invention and the curve 40 represents the same outline reproduced with the invention. As can be appreciated, the transition between the light and dark areas with the invention in place occurs very gradually so as not to be as visually perceptible as it would otherwise be in the absence of the optical system 12. Therefore the visual artifacts or fringing effects near outline areas in the transparency are not as visually disturbing as they would have been previously. Thus the optical system 12 serves as a means by which the effects of visual artifacts can be minimized when printing enlargements with electronic enlargers employing flying spot scanning systems as sources for illumination.

It will be obvious to those skilled in the art that other changes may be made in the above described embodiment without departing from the scope of the invention. For example, the optical system of the invention may just as easily be employed in a color enlarging scheme to make color separation masks provided the enlarging system has appropriate red, green and blue filters. Also, the shaded aperture mask of the invention may, if desired, be placed at or near the aperture stop of the projection lens 26. Therefore, it is intended that all matter contained in the above description or shown in the accompanying drawings shall be interpreted as illustrative and not in a limiting sense.

What is claimed is:

1. Apparatus for projecting an image of a transparency onto a sheet of photosensitive material, said apparatus comprising:

means for holding the transparency and the photosensitive material in separated planes;

a projection lens for forming an image of the transparency in the photosensitive material plane; and means for illuminating the transparency such that the intensity of illumination over the transparency varies in a predetermined manner in accordance with the local density of the transparency to change the range of tones in the image projected by said projection lens onto the photosensitive material plane and such that fringe artifacts surrounding outline areas in the transparency are rendered visually unobjectionable in prints of the transparency, said illuminating means comprising:

(A) A flying spot scanner spaced away from said transparency plane by a predetermined distance; and (B) optical means for imaging the flying spot of said flying spot scanner into a transparency and for altering the inherent energy distribution of said flying spot so that, as outline areas of the transparency are scanned, fringing areas surrounding outline areas of the transparency vary in a gradual manner thereby rendering fringing visually unobjectionable in prints of a transparency.

2. The apparatus of claim 1 wherein said optical means comprises an objective lens structured to operate at one to one conjugates to image said flying spot onto the transparency and an aperture mask, located more or less at the aperture stop of said objective lens, having a density which radially increases from the center to the edges thereof.

3. The apparatus of claim 1 wherein said flying spot scanner comprises a cathode ray tube.

4. Apparatus for projecting an image of a transparency onto a sheet of photosensitive material, said apparatus comprising:

means for holding the transparency and the photosensitive material in separated planes;

a projection lens for forming an image of the transparency in the photosensitive material plane; and means for providing a pattern of illumination more or less in registration with the transparency during an exposure interval such that the intensity of said pattern varies in intensity in a predetermined manner in accordance with the local density of the transparency to change the range of tones in the image projected onto the photosensitive material plane and such that fringe artifacts surrounding outline areas in the transparency are rendered visually unobjectionable in prints of the transparency, said pattern of illumination providing means comprising:

(A) A flying spot scanner spaced away from said transparency plane by a predetermined distance; and (B) optical means for imaging the flying spot of said flying spot scanner into a transparency and for altering the inherent energy distribution of said flying spot so that, as outline areas of the transparency are scanned, fringing areas surrounding outline areas of the transparency vary in a gradual manner thereby rendering fringing visually unobjectionable in prints of a transparency.

5. The apparatus of claim 4 wherein said optical means comprises an objective lens structured to operate at one to one conjugates to image said flying spot onto the transparency and an aperture mask, located more or less at the aperture stop of said objective lens, having a density which radially increases from the center to the edges thereof.

6. The apparatus of claim 4 wherein said flying spot scanner comprises a cathode ray tube.

* * * * *